US011559860B2

(12) United States Patent
Zhang et al.

(10) Patent No.: US 11,559,860 B2
(45) Date of Patent: Jan. 24, 2023

(54) WELDING WIRES FORMED FROM IMPROVED ALUMINUM-MAGNESIUM ALLOYS

(71) Applicants: General Cable Technologies Corporation, Highland Heights, KY (US); NanoAl, LLC, Skokie, IL (US)

(72) Inventors: Shenjia Zhang, Zionsville, IN (US); Nhon Q. Vo, Skokie, IL (US); Janusz Stanislaw Sekunda, Williamsport, PA (US); Jean Bilodeau, Jonquiere (CA); Martin Lecours, Chicoutimi (CA)

(73) Assignees: GENERAL CABLE TECHNOLOGIES CORPORATION, Highland Heights, KY (US); NANOAL, LLC, Skokie, IL (US)

( * ) Notice: Subject to any disclaimer, the term of this patent is extended or adjusted under 35 U.S.C. 154(b) by 889 days.

(21) Appl. No.: 16/397,018

(22) Filed: Apr. 29, 2019

(65) Prior Publication Data

US 2019/0329363 A1 Oct. 31, 2019

Related U.S. Application Data

(60) Provisional application No. 62/664,887, filed on Apr. 30, 2018.

(51) Int. Cl.
*B23K 35/28* (2006.01)
*B21C 1/02* (2006.01)
*B23K 35/02* (2006.01)
*C22C 1/02* (2006.01)
*C22C 21/08* (2006.01)

(52) U.S. Cl.
CPC ............. *B23K 35/288* (2013.01); *B21C 1/02* (2013.01); *B23K 35/0261* (2013.01); *C22C 1/026* (2013.01); *C22C 21/08* (2013.01)

(58) Field of Classification Search
None
See application file for complete search history.

(56) References Cited

U.S. PATENT DOCUMENTS

| | | | |
|---|---|---|---|
| 4,017,337 A | 4/1977 | Winter et al. | |
| 4,183,771 A | 1/1980 | Setzer et al. | |
| 4,880,709 A | 11/1989 | Holroyd et al. | |
| 6,933,468 B2 | 8/2005 | Keegan et al. | |
| 10,096,394 B2 * | 10/2018 | Sekiya | C22F 1/043 |
| 2008/0029188 A1 | 2/2008 | Hong et al. | |
| 2008/0193792 A1 | 8/2008 | Cottignies et al. | |
| 2015/0030496 A1 | 1/2015 | McLeod et al. | |
| 2015/0072170 A1* | 3/2015 | Lin | B23K 15/0093 |
| | | | 228/256 |
| 2015/0132181 A1 | 5/2015 | Anderson et al. | |

FOREIGN PATENT DOCUMENTS

| | | |
|---|---|---|
| CN | 101176955 B | 8/2011 |
| CN | 104607818 A | 5/2015 |
| CN | 104690443 A | 6/2015 |
| CN | 104690444 A | 6/2015 |
| CN | 105695823 A | 6/2016 |
| EP | 0521580 A1 | 1/1993 |
| GB | 2246578 A | 2/1992 |
| RU | 2111826 C1 | 5/1998 |
| RU | 2393073 C1 | 6/2010 |
| RU | 2636548 C1 | 11/2017 |

OTHER PUBLICATIONS

Kipp, Dale O . . . (2017). MatWeb Metal Material Data Sheets (MDS). MatWeb, LLC . . . Retrieved from https://app.knovel.com/hotlink/toc/id:kpMMDS0002/matweb-metal-material/matweb-metal-material (Year: 2017).*
Alcotechnics; Alloy 5356 Weld Data Sheet; Mar. 7, 2016; available at http://www.alcotec.com/us/en/support/upload/a5356tds.pdf; 4 pages.
Liu, Yonghe; Partial European Search Report issued in European Patent Application No. 19171726.3; dated Jul. 16, 2019. 11 pages.
Alhassan; Saja Mohammed; Examination Report issued in GCC Patent Application No. 2019-37478; dated Jan. 28, 2021; 6 pages.
Alhassan, Saja Mohammed; Second Examination Report issued in GCC Patent Application No. 2019-37478; dated Oct. 19, 2021; 5 pages.
Salenko, N.A.; Office Action and Search Report issued in Russian Patent Application No. 2019113131; dated Nov. 19, 2021; 16 pages including English translation.
Liu, Yonghe; Communication pursuant to Article 94(3) EPC, issued in European Patent Application No. 19171726.3; dated Mar. 25, 2022; 4 pages.
Liu, Yonghe; Office Action issued in European Patent Application No. 19171726.3; dated Sep. 15, 2020; 3 pages.
Liu, Yonghe; Extended European Search Report, including the European Search Report and the European Search Opinion, issued in European Patent Application No. 19171726.3; dated Nov. 14, 2019; 11 pages.
The Aluminum Association; International Alloy Designations and Chemical Composition Limits for Wrought Aluminum and Wrought Aluminum Alloys; Registration Record Series, Teal Sheets, The Aluminum Association; Jan. 2015; 38 pages.
Liu, Yonghe; Office Action issued in European Patent Application No. 19171726.3; dated May 14, 2021; 3 pages.
Mokashi, Mangesh L.; Office Action issued in Indian Patent Application No. 201924016831; dated May 23, 2022; 6 pages.

* cited by examiner

*Primary Examiner* — Daniel J. Schleis
(74) *Attorney, Agent, or Firm* — Ulmer & Berne LLP

(57) ABSTRACT

Aluminum-magnesium alloys useful as welding wire and mechanical support are disclosed. The aluminum-magnesium alloys exhibit improved cold wire drawing performance. Grain refiners and methods of forming the aluminum-magnesium alloys are further disclosed.

11 Claims, No Drawings

WELDING WIRES FORMED FROM IMPROVED ALUMINUM-MAGNESIUM ALLOYS

CROSS-REFERENCE TO RELATED APPLICATIONS

The present application claims the priority of U.S. Provisional Patent Application Ser. No. 62/664,887, entitled IMPROVED ALUMINUM-MAGNESIUM ALLOYS AND METHODS OF FORMING THEREOF, filed Apr. 30, 2018, and hereby incorporates the same application herein by reference in its entirety.

TECHNICAL FIELD

The present disclosure generally relates to welding wires formed from improved aluminum-magnesium alloys. Grain refiners for formation of such aluminum-magnesium alloys are further disclosed.

BACKGROUND

Certain metal alloys are useful for welding and mechanical support due to the properties exhibited by such alloys. For example, metal alloys suitable for welding can exhibit high strength, wetting, and ductility. Generally, welding alloys have the same base metal as the material to be welded but can have different formulations to enhance use as a welding alloy. To facilitate use of welding and other mechanical support metal alloys, it is common to use cold metal processing techniques such as cold metal wire drawing. However, known aluminum alloys for welding and mechanical support suffer from poor cold metal processing.

U.S. Pat. No. 4,183,771 describes an aluminum alloy conductor wire having an electrical conductivity of at least 60.0% IACS which involves processing an alloy containing from 0.04 to 1.0% by weight iron, from 0.02 to 0.2% by weight silicon, from 0.1 to 1.0% by weight copper, from 0.001 to 0.2% by weight boron, balance essentially aluminum and processing said alloy without a final redraw step into wire.

U.S. Patent App. Pub. No. 2008/0193792 describes an aluminum-based welding filler wire which is made with an aluminum alloy that contains between 0.1 and 6 wt. % titanium, including one portion in the form of $TiB_2$ particles, TiC particles, or a combination thereof, and another portion in the form of free titanium.

U.S. Patent App. Pub. No. 2015/0030496 describes a non-heat-treatable, wrought aluminum alloy useful for vehicle parts including wire and wire assemblies. The aluminum alloy used to manufacture the parts is formed predominantly from aluminum (Al) metal, which is alloyed primarily with magnesium (Mg), and which also includes silicon (Si), iron (Fe), copper (Cu), manganese (Mn), chromium (Cr), zinc (Zn), titanium (Ti), beryllium (Be) and other elements.

U.S. Patent App. Pub. No. 2015/0132181 describes a composition for producing aluminum casting, wrought, and welding filler metal alloys having a chemistry comprising Si varying from approximately 0.1 and 0.9 wt %, Mn varying from approximately 0.05 to 1.2 wt %, Mg varying from approximately 2.0 to 7.0 wt %, Cr varying from approximately 0.05 to 0.30 wt %, Zr varying from approximately 0.05 to 0.30 wt %, Ti varying from approximately 0.003 to 0.20 wt %, and B varying from approximately 0.0010 to 0.030 wt %, and a remainder of aluminum and various trace elements.

SUMMARY

In accordance with one embodiment, a welding wire formed from an aluminum-magnesium alloy including aluminum, magnesium, titanium, boron, about 0.06% to about 0.12%, by weight, iron, and about 0.06% to about 0.12%, by weight, silicon. The weight ratio of titanium to boron is about 25:1 or greater.

In accordance with another embodiment, a method of forming a welding wire from an aluminum-magnesium alloy includes melting one or more metal components to form a pre-alloy mixture, combining the pre-alloy mixture with a grain refiner to form an aluminum-magnesium alloy, and cold drawing the aluminum-magnesium alloy to form the welding wire. The grain refiner includes aluminum, titanium, and boron and has a weight ratio of titanium to boron of about 25:1 or greater.

DETAILED DESCRIPTION

Known aluminum-magnesium alloys useful for welding and mechanical support suffer from various issues. For example, common aluminum welding and mechanical support alloys (hereinafter "aluminum mechanical alloys"), such as 5000-series aluminum-magnesium alloys, can exhibit poor cold metal processing and can break in cold wire drawing processes. It has been discovered that modification of aluminum mechanical alloys to include reduced loading quantities of iron and silicon, and optionally increased loading quantities of chromium, can result in aluminum mechanical alloys which exhibit improved cold metal processing. In certain embodiments, such aluminum mechanical alloys can be further improved by forming the alloys with a grain refiner including a lower loading level of boron.

As can be appreciated, a number of aluminum alloy grades have been standardized by the Accrediting Standards Committee H35 of the Aluminum Association. Standardized aluminum grades are defined by their elemental compositions with the various grades generally intended for specific applications and industries. Such aluminum grades were published by the Aluminum Association in January 2015 in the "International Alloy Designations and Chemical Composition Limits for Wrought Aluminum and Wrought Aluminum Alloys." According to the Aluminum Association, 1000-series aluminum alloys are defined as being high purity aluminum alloys and 7000-series aluminum alloys are defined as zinc and magnesium containing alloys. 1000-series aluminum alloys are useful in the overhead conductor industry while 7000-series aluminum alloys are useful in the aerospace industry. 5000-series aluminum alloys are aluminum-magnesium alloys which are useful to form structural articles and as reinforcement due to the strength imparted by inclusion of high loading quantities of magnesium.

In certain embodiments, the aluminum mechanical alloys described herein can be 5000-series aluminum alloys. In certain embodiments, the aluminum mechanical alloys described herein can retain the strength of known 5000-series aluminum alloys due to the retention of high magnesium loading levels.

It has been discovered that modification of the loading levels of iron, silicon, and optionally chromium can improve the cold wire drawing performance of aluminum mechanical alloys. For example, in certain embodiments, the cold wire drawing performance of a 5000-series aluminum can be improved through the inclusion of iron at a loading level of about 0.12% or less. In certain embodiments, iron can be included at about 0.10% or less. In certain embodiments, iron can be included at about 0.06% or less. In certain embodiments, silicon can be included at about 0.12% or less. In certain embodiments, silicon can be included at about 0.10% or less. In certain embodiments, silicon can be included at about 0.06% or less.

For certain aluminum mechanical alloys, such as aluminum-magnesium alloys suitable for welding, the loading level of chromium can additionally be increased. In certain such embodiments, chromium can be included at about 0.08% or greater, in certain embodiments, at about 0.10% or greater, in certain embodiments, at about 0.12% or greater, and in certain embodiments, at about 0.15% or greater. In certain embodiments, such aluminum-magnesium alloys can be an AA5356 or AA5056 aluminum-magnesium alloys.

AA5356 aluminum alloys are defined by unified number system ("UNS") AA5356 standard and include, by weight, 0.40% or less iron, 0.25% or less silicon, 0.10% or less copper, 0.05% to 0.20% manganese, 4.5% to 5.5% magnesium, 0.05% to 0.20% chromium, 0.10% or less zinc, 0.06% to 0.20% titanium, 0.0003% or less beryllium, 0.05% or less each other element with a total of less than 0.15% of each other element, and the remainder aluminum. AA5356 alloys can be useful for welding applications.

AA5056 aluminum alloys are defined by unified number system ("UNS") and include 4.5% to 5.6% magnesium, 0.4% or less iron, 0.3% or less silicon, 0.050% to 0.2% manganese, 0.050% to 0.2% chromium, 0.1% or less chromium, 0.1% or less zinc, 0.1% or less copper, 0.05% or less each other element with a total of less than 0.15% of each other element, and the remainder aluminum. AA5056 alloys can be useful for welding applications.

AA5154A aluminum alloys are defined by unified number system ("UNS") and include, by weight, 0.50% or less iron, 0.50% or less silicon, 0.10% or less copper, 0.50% manganese, 3.1% to 3.9% magnesium, 0.25% chromium, 0.10% or less zinc, 0.06% to 0.20% titanium, 0.0003% or less beryllium, 0.05% or less each other element with a total of less than 0.15% of each other element, and the remainder aluminum. AA5154A alloys can be useful to form mechanical support articles such as a wire mesh or auger.

As can be appreciated, certain aluminum mechanical alloys described herein can satisfy the requirements of standardized aluminum alloy grades. For example, the loading quantities of iron, silicon, and chromium can remain within the standards of AA5356, AA5056, and AA5154A aluminum alloys. As can be appreciated however, certain aluminum alloys described herein can alternatively be outside the standards of any named aluminum alloys.

In certain embodiments, the cold wire drawing performance of the aluminum mechanical alloys described herein can be further improved by forming the alloy with a modified grain refiner. As can be appreciated, modification of the grain refiner can affect the microstructure of the aluminum mechanical alloys described herein.

For example, it has been found that improved cold wire drawing performance can be enhanced by reducing the amount of boron in the grain refiner. As can be appreciated, the inclusion of boron in a grain refiner forms particles of $TiB_2$ which can improve the homogeneity and distribution of other elements in the aluminum-magnesium alloy. However, $TiB_2$ particles do not dissolve in aluminum and it has been found that reducing the quantity of boron can improve the cold metal wire drawing of an aluminum-magnesium alloy.

In certain embodiments, suitable grain refiners can include aluminum, titanium, and boron. The weight ratio of titanium to boron in the grain refiner can be about 25:1 or greater, wherein the weight ratio can refer to the weight percent of the first material to the weight percent of the second material. For example, suitable grain refiners can include about 0.2% or less boron, in certain embodiments, about 0.1% or less boron, in certain embodiments, about 0.05% or less boron, and in certain embodiments, be substantially free of boron. As used herein, "substantially free of" means that the component is included at about 0.001% or less by weight or is present only as an unavoidable contaminant. In certain embodiments, suitable grain refiners can include about 5% titanium, about 0.2% boron, and the remainder aluminum. In certain embodiments, suitable grain refiners can include about 6% titanium and the remainder aluminum, wherein the grain refiner is substantially free of boron.

In certain embodiments, an aluminum-magnesium alloy formed with the low boron grain refiners described herein can have a ratio of titanium to boron of about 25:1, or greater, including a ratio of about 50:1 or greater. In contrast, an aluminum-magnesium alloy formed using a conventional grain refiner with a typical amount of boron, can have a ratio of titanium to boron of about 25:1 or less.

Grain refiners can generally be used as known in the art. For example, grain refiners can be added as a masterbatch to molten aluminum or aluminum alloy and then cast into a bar form. In certain embodiments, grain refiners can contribute all of the titanium and/or boron in an aluminum mechanical alloy as described herein and can be mixed with aluminum at an appropriate loading quantity to achieve desired loading levels of titanium and boron.

Generally, the aluminum mechanical alloys described herein can be formed as known in the art. For example, substantially pure aluminum can be melted at a temperature of about 537° C. to 704° C. (1000° F. to about 1300° F.) and then additional elements such as magnesium, iron, and silicon can be added in accordance to their desired weight percentage. In certain embodiments, certain elements can advantageously be added using a grain refiner to further control microcrystalline structure. Once all of the elements are present in accordance to their desired weight percentage, the molten aluminum mixture can be cast to form an aluminum mechanical alloy as described herein.

As can be appreciated, many variations to the process of casting an aluminum alloy are known. For example, various stirring steps can be performed on the molten aluminum mixture to improve homogeneity. Additionally, or alternatively, the molten aluminum mixture can be allowed to settle for a period of time to allow unwanted inclusion particles to be deposited as sediment and be removed. In certain embodiment, the molten aluminum mixture can also be refined to remove impurities using, for example, alloying constituents and precise temperature control to precipitate undesired impurities out of the molten mixture.

Generally, the aluminum mechanical alloys described herein can exhibit desirable microcrystalline properties. For example, the aluminum mechanical alloys can exhibit a shrinkage porosity of about 10% or less in certain embodiments, a shrinkage porosity of about 8% or less in certain embodiments, and a shrinkage porosity of about 5% or less in certain embodiments. The radial grain size difference can be about 20% or less in certain embodiments, about 15% or less in certain embodiments, and about 5% or less in certain embodiments. The interdendritic spacing of the aluminum mechanical alloys described herein can be about 3 microns to about 12 microns in certain embodiments, about 6 microns to about 10 microns in certain embodiments, or about 5 microns to about 8 microns in certain embodiments. Shrinkage porosity can refer to cavities formed in the alloy as the alloy cools and shrinks from the molten state. Radial grain size refers to the size of the crystalline grain in a cross-section of the alloy. Interdendritic spacing can refer to the spacing between adjacent dendritic structures in the aluminum-magnesium alloy.

As can be appreciated, the aluminum mechanical alloys described herein can be useful for a variety of tasks. For example, in certain embodiments, the aluminum mechanical alloy can be an AA5356 or an AA5056 aluminum-magnesium alloy and can be useful as welding material and can be useful, for example, for the formation of welding wire or welding electrodes. Alternatively, certain aluminum mechanical alloys described herein, such as AA5154A alloys, can be used as mechanical support and can form reinforcement structures such as meshes and augers. The improved cold wire drawing performance of the aluminum mechanical alloys described herein can facilitate such uses by decreasing breakage of the alloy when processing into a welding wire or supportive mechanical shape.

Example 5 was formed using a grain refiner including 5% titanium, 0.2% boron, and remainder aluminum obtained from AMG Aluminum North America, LLC (Wayne, Pa.). Similar grain refiners are sold under the names AlTi5B0.2, AA-H2207, and CEN-92252). Example 6 was formed using a grain refiner including 6% titanium and remainder aluminum obtained from AMG Aluminum North America, LLC (Wayne, Pa.). Similar grain refiners are sold under the name AlTi6.

Examples 7 to 9 are similar to Examples 4 to 6, but include low loading levels of iron and silicon, and no adjustment to chromium. Example 7 includes 0.092% iron and 0.048% silicon. Examples 8 and 9 each include 0.089% iron and 0.048% silicon. Examples 8 and 9 use the grain refiners of Examples 5 and 6 respectively (5% titanium, 0.2% boron, and remainder aluminum for Example 8 and 6% titanium and remainder aluminum for Example 9).

TABLE 1

| Ex. | Si (%) | Fe (%) | Cu (%) | Mn (%) | Mg (%) | Cr (%) | Zn (%) | Ti (%) | B (%) | Be (%) | V (%) | Other (each) (%) | Other (total) (%) |
|---|---|---|---|---|---|---|---|---|---|---|---|---|---|
| 1 | <0.25 | <0.40 | <0.10 | 0.05-0.20 | 4.5-5.5 | 0.05-0.20 | <0.10 | 0.06-0.20 | — | <0.0003 | — | <0.05 | <0.15 |
| 2 | <0.10 | 0.10-0.18 | <0.05 | 0.13-0.18 | 4.55-4.85 | 0.05-0.07 | <0.10 | 0.060-0.090 | 0.0005-0.0015 | <0.0003 | <0.03 | — | <0.15 |
| 3 | 0.07 | 0.14 | 0.02 | 0.15 | 4.763 | 0.054 | 0.01 | 0.09 | 0.01 | 0.00 | 0.02 | — | — |
| 4 | 0.049 | 0.098 | 0.001 | 0.154 | 4.58 | 0.122 | 0.003 | 0.093 | 0.005 | 0 | 0.018 | — | — |
| 5 | 0.051 | 0.102 | 0.001 | 0.161 | 4.77 | 0.128 | 0.004 | 0.091 | 0.001 | 0 | 0.019 | — | — |
| 6 | 0.051 | 0.103 | 0.001 | 0.16 | 4.766 | 0.128 | 0.004 | 0.093 | 0 | 0 | 0.019 | — | — |
| 7 | 0.048 | 0.092 | 0 | 0.145 | 4.606 | 0.059 | 0.003 | 0.091 | 0.005 | 0 | 0.021 | — | — |
| 8 | 0.048 | 0.089 | 0 | 0.146 | 4.539 | 0.059 | 0.003 | 0.094 | 0.001 | 0 | 0.021 | — | — |
| 9 | 0.047 | 0.088 | 0 | 0.144 | 4.548 | 0.057 | 0.003 | 0.096 | 0 | 0 | 0.02 | — | — |

EXAMPLES

Table 1 depicts the compositional formulations of Examples 1 to 9. Examples 1 to 9 are examples of AA5356 aluminum-magnesium alloys. Examples 1 to 3 are commercial samples of AA5356 aluminum-magnesium alloys obtained from the Aluminum Association, Inc. (Arlington, Va.) (Example 1) or General Cable Technologies Corp. (Highland Heights, Ky.) (Examples 2 and 3). Examples 2 to 4, and 7 were formed using a grain refiner including 5% titanium, 1% boron, and remainder aluminum obtained from AMG Aluminum North America, LLC (Wayne, Pa.). Similar grain refiners are sold under the names AlTi5B1, AA-H2252, and CEN-92256). Examples 4 to 9 are AA5356 aluminum-magnesium alloys with certain quantities of iron, silicon, and chromium that differ from conventional AA5356 aluminum-magnesium alloys. Examples 4 to 9 remain within the standards of AA5356 aluminum alloys however.

Specifically, Examples 4 to 6 include low loading levels of iron and silicon and high loading levels of chromium. Example 4 specifically includes 0.098% iron, 0.049% silicon, and 0.122% chromium. Examples 5 and 6 are similar to Example 4 (Example 5 has 0.102% Fe, 0.051% Si, and 0.128% Cr and Example 6 has 0.103% Fe, 0.051% Si, and 0.128% Cr) but were formed with alternative grain refiners.

Table 2 reports the results of cold wire drawing on the aluminum-magnesium alloys of Examples 3 to 9. For the cold wire drawing tests, rods of diameter 9.5 mm were successively reduced using a cold wire drawing process to diameters of 2.5 mm, 1.8 mm, and 0.9 mm wires. Table 2 also reports the shrinkage porosity, radial grain size difference, and interdendritic spacing of each of Examples 3 to 9.

Shrinkage porosity was measured using 7× micrographs of transverse cross-sections of cast bars. Radial grain size differences were measured using electron backscatter diffraction per ASTM E2627-13. Grain sizes were measured close to bar center and bar surface respectively and then calculating the respective differences. Interdendritic spacing was measured in accordance to GMW16436 $2^{nd}$ Edition 2015, Method A.

TABLE 2

| Ex. | Wire Drawing (2.5 mm) | Wire Drawing (1.8 mm) | Wire Drawing (0.9 mm) | Shrinkage Porosity (mm$^2$) | Radial Grain Size Difference (%) | Interdendritic Spacing (μm) |
|---|---|---|---|---|---|---|
| 3 | Multiple breaks | — | — | 11.1 | 56.70 | N/A |
| 4 | No break | — | — | 7 | 17.20 | 3-7 |
| 5 | No break | No break | No break | 5 | 3.50 | 3-7 |
| 6 | No break | No break | No break | 8.9 | 0.20 | 7-11 |
| 7 | No break | — | — | 7 | 14.10 | 5-8 |
| 8 | No break | — | — | 11.4 | 8.20 | 6-10 |
| 9 | No break | — | — | 9.9 | 2.30 | 7-11 |

As depicted in Table 2, Examples 5 and 6 are considered inventive examples because each was able to be drawn down to a diameter of 0.9 mm without breakage. Examples 5, 6, 8 and 9 also demonstrated substantially reduced radial grain size differences compared to known AA5356 aluminum-magnesium alloys (Example 3) and AA5356 aluminum-magnesium alloys formed using a known grain refiner formed of 5% titanium, 1% boron, and remainder aluminum.

Table 3 depicts the compositional formulations of AA5154A aluminum-magnesium alloys. Example 10 is a commercial AA5154A aluminum-magnesium alloy obtained from the Aluminum Association, Inc. (Arlington, Va.). Example 10 has a total amount of manganese and chromium between 0.10% to 0.50%. Example 11 is a commercial AA5154A aluminum-magnesium alloy obtained from General Cable Technologies Corp. (Highland Heights, Ky.). Example 11 was formed using a grain refiner having 5% titanium, 1% boron, and the remainder being aluminum obtained from AMG Aluminum North America, LLC (Wayne, Pa.). Example 12 is an AA5154A aluminum-magnesium alloy formed using lowered loading quantities of iron (0.06-0.12%) and silicon (0.07% or less) and was formed using a 5% titanium, 0.2% boron, and remainder aluminum grain refiner obtained from AMG Aluminum North America, LLC (Wayne, Pa.).

TABLE 3

| Ex. | Si (%) | Fe (%) | Cu (%) | Mn (%) | Mg (%) | Cr (%) | Zn (%) | Ti (%) | B (%) | Be (%) | V (%) | Other-Each (%) | Other Total (%) |
|---|---|---|---|---|---|---|---|---|---|---|---|---|---|
| 10 | <0.50 | <0.50 | <0.10 | 0.50 | 3.1-3.9 | 0.25 | <0.20 | <0.20 | — | — | — | <0.05 | <0.15 |
| 11 | 0.055 | 0.134 | 0.001 | 0.113 | 3.56 | 0.005 | 0.003 | 0.014 | 0.0024 | 0.00001 | 0.013 | <0.05 | <0.10 |
| 12 | 0.04507 | 0.07413 | 0.00093 | 0.11683 | 3.53833 | 0.002 | 0.00233 | 0.01257 | 0.00035 | 0.00001 | 0.0158 | <0.05 | <0.10 |

Table 4 reports the results of cold wire drawing on the aluminum-magnesium alloys of Examples 11 and 12. For the cold wire drawing tests, rods of diameter 9.5 mm were successively reduced using a cold wire drawing process to a diameter of 0.2 mm. If the wire fractured during wire drawing, a break was recorded.

TABLE 4

| Example | Wire Drawing (0.2 mm) |
|---|---|
| 11 | Multiple Breaks |
| 12 | No Break |

As depicted by Table 4, AA5154A aluminum-magnesium alloys formed with reduced loading quantities of iron and silicon and formed using an alternative grain refiner demonstrated better cold metal working than a convention aluminum-magnesium alloy.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of ordinary skill in the art. Rather it is hereby intended the scope be defined by the claims appended various embodiments. The scope is, of course, not limited to the examples or embodiments set forth herein, but can be employed in any number of applications and equivalent articles by those of hereto.

What is claimed is:

1. A welding wire formed from an AA5356 aluminum-magnesium alloy comprising:
    iron, wherein iron is present in an amount greater than 0% and less than or equal to about 0.12%, by weight;
    silicon, wherein silicon is present in an amount greater than 0% and less than or equal to about 0.12%, by weight;
    about 0.0005% to about 0.002% copper;
    about 0.12% to about 0.18% manganese;
    about 4.55% to about 4.85% magnesium;
    about 0.05% to about 0.15% chromium;
    about 0.002% to about 0.006% zinc;
    about 0.08% to about 0.10% titanium;
    boron, wherein boron is present in an amount greater than 0% and less than or equal to about 0.001%;
    about 0.015% to about 0.025% vanadium; and
    wherein the remainder is aluminum; and
    wherein the weight ratio of titanium to boron is about 25:1 or greater.

2. The welding wire of claim 1, wherein the aluminum magnesium alloy is formed with a grain refiner, wherein the grain refiner comprises:
    aluminum;
    about 5% to about 6%, by weight, titanium; and
    about 0.2% or less, by weight, boron.

3. The welding wire of claim 2, wherein the grain refiner is substantially free of boron.

4. The welding wire of claim 1, wherein the aluminum magnesium alloy comprises about 0.10% to about 0.14%, by weight, chromium.

5. The welding wire of claim 1, wherein the aluminum magnesium alloy exhibits an interdendritic spacing of about 3 μm to about 7 μm.

6. The welding wire of claim 1, wherein the aluminum magnesium alloy exhibits a shrinkage porosity of about 9% or less.

7. The welding wire of claim 1, wherein the aluminum magnesium alloy exhibits a radial grain size difference of about 20% or less.

8. The welding wire of claim 1, wherein the aluminum magnesium alloy exhibits a radial grain size difference of about 5% or less.

9. The welding wire of claim 1 is a welding electrode.

10. The welding wire of claim 1, wherein the weight ratio of titanium to boron is about 50:1 or greater.

11. The welding wire of claim 1, wherein the aluminum magnesium alloy is formed with a grain refiner, wherein the grain refiner comprises:
   aluminum;
   titanium; and
   boron; and
   wherein the grain refiner has a weight ratio of titanium to boron of about 25:1 or greater.

* * * * *